United States Patent [19]

[11] 4,381,916

[45] May 3, 1983

Warshawsky

[54] METHOD AND APPARATUS FOR ROASTING FINE GRAINED ORES

[75] Inventor: Jay Warshawsky, Allentown, Pa.

[73] Assignee: Fuller Company, Bethlehem, Pa.

[21] Appl. No.: 301,163

[22] Filed: Sep. 11, 1981

[51] Int. Cl.³ .......................... F27B 15/00; F27B 7/02; C04B 7/02

[52] U.S. Cl. .......................... 432/14; 106/100; 432/17; 432/58; 432/106

[58] Field of Search .......................... 432/14, 17, 58, 106; 106/100

[56] References Cited

U.S. PATENT DOCUMENTS

| | | | |
|---|---|---|---|
| 3,881,861 | 5/1975 | Ritzmann | 432/106 |
| 3,904,353 | 9/1979 | Bosshard | 432/14 |
| 4,014,641 | 3/1977 | Shigeyashi | 432/58 |
| 4,127,406 | 11/1978 | Kreft et al. | 432/14 |
| 4,249,892 | 2/1981 | Brachthauser et al. | 106/100 |
| 4,270,900 | 6/1981 | Shy et al. | 432/58 |

*Primary Examiner*—John J. Camby
*Attorney, Agent, or Firm*—Frank H. Thomson

[57] ABSTRACT

A method and apparatus for roasting fine grained ores such as cement raw meal, lime, dolomite, gypsum, phosphate rock and the like. A suspension preheater consisting of a plurality of serially connected cyclone separators is utilized to preheat the raw material. A suspension type roasting furnace follows the suspension preheater which is, depending upon the material being treated, followed by either a rotary kiln for further heat treatment of the material or by a cooler for cooling the product. The apparatus includes an arrangement for recirculating a portion of the material which has passed through the roasting furnace back into the roasting furnace to increase the degree of roasting. An existing preheater, suspension type calciner, rotary kiln cement clinker producing plant can be converted to the method and apparatus by the addition of an appropriately located splash plate.

13 Claims, 10 Drawing Figures

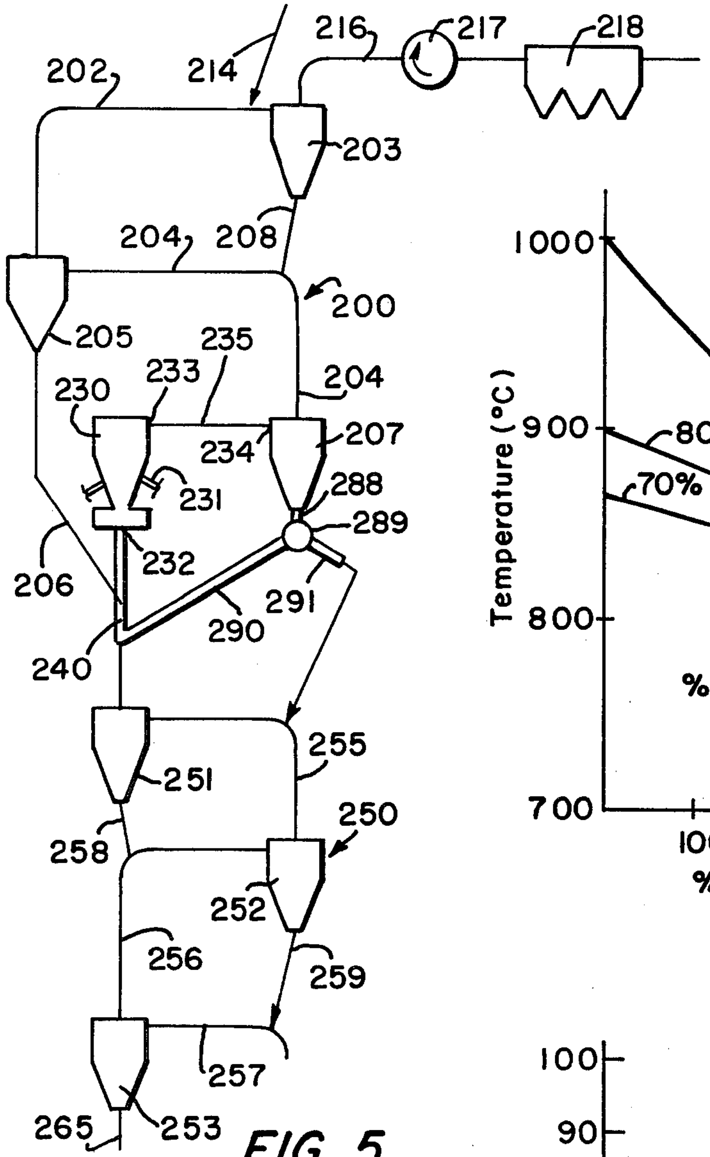
FIG. 5
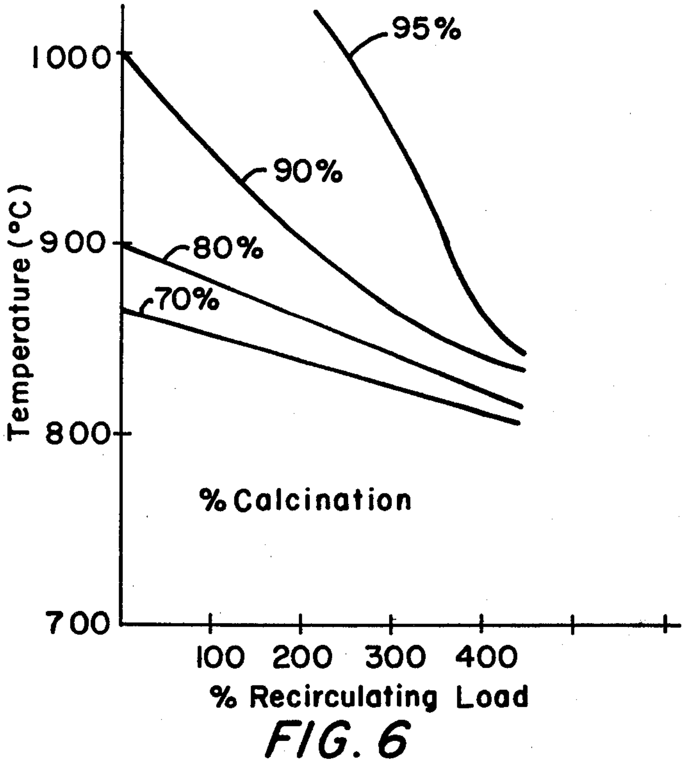
FIG. 6
FIG. 9
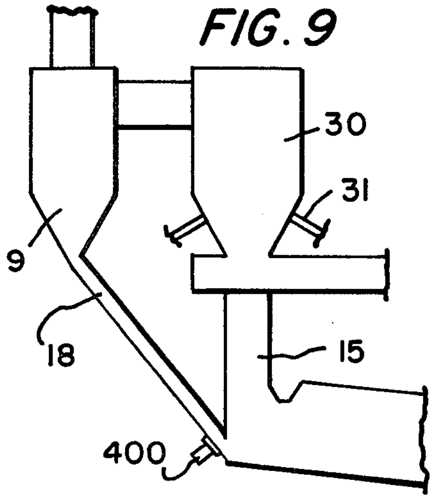
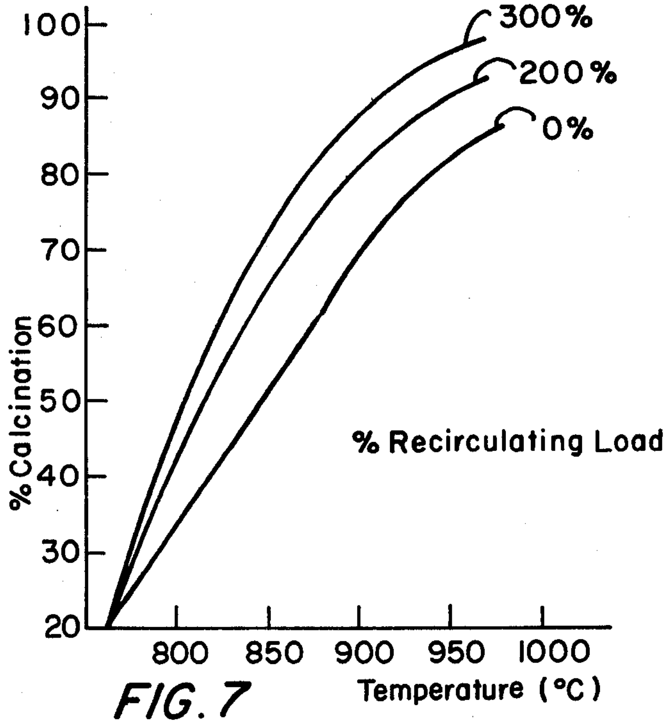
FIG. 7

METHOD AND APPARATUS FOR ROASTING FINE GRAINED ORES

BACKGROUND OF THE INVENTION

This invention relates to the roasting of fine grained ores such as cement raw meal, lime, dolomite, gypsum, phosphate rock and the like and more particularly to a method and apparatus for calcining such fine grained materials at a lower temperature or at lower fuel consumption or both than with prior methods and apparatus.

Prior to the present invention, it was well known in the manufacture of cement clinker to process the cement raw meal by utilizing a suspension preheater consisting of a plurality of serially connected cyclone separators followed by a rotary kiln followed by a material cooler. The raw material enters the suspension preheater and is alternately and repeatedly entrained and separated in the stream of hot gases being exhausted from the kiln to thereby preheat the raw meal before it is supplied to the kiln for calcining and clinkering. Utilization of such an apparatus reduces the heat consumption in the cement making process from that of a long dry kiln or a wet process cement manufacturing process.

The next major improvement in the manufacture of cement clinker was the addition of a separate calciner between the suspension preheater and the rotary kiln. The furnace itself can take many different forms, but basically the concept of such furnaces is to maintain in suspension the material to be roasted or calcined while burning fuel in that furnace to maintain the temperature in the furnace sufficiently high to achieve 80–90% calcination of the raw material at a furnace temperature of approximately 900° C. The thus calcined raw material is then supplied to the rotary kiln for the final burning to produce cement clinker.

Higher calcination levels are attainable at furnace temperatures above 900° C.; however, the risk of preheater plugging is increased at elevated temperatures, particularly when using coal as the fuel.

It is known that the degree of calcination is a factor of temperature and the amount of time that a raw material is exposed to that temperature. With apparatus of the type to which the present invention relates in which a suspension type calcining furnace is utilized, temperatures for calcining cement raw meal are on the order of 900° C., but the residence time of the raw material within the calcining furnace and thus the period of time to which the material is exposed to heat at 900° C. is limited to a matter of seconds. Accordingly, if the temperature is increased or the duration of the material exposure to that temperature is increased, the amount of calcination should also be increased. It is known that if the length of time that the material is exposed to the high temperature is increased, then there can be a reduction in the temperature required for a given amount of calcination.

It has been found by the present invention that the degree of roasting or calcination can be increased or in the alternate, the degree of roasting or calcination can be held generally constant at a lower calcining furnace temperature by increasing the number of passes of the material through the calcining furnace. While the residence time of the material within the calcining furnace for any given pass of the material remains the same as with prior apparatus, the increase in the number of passes serves to effectively increase the residence time of the material being roasted within the calcining system.

Because the present system permits lower operating temperatures in the calcining furnace, the gas temperatures throughout the suspension preheater are reduced, and there are lower heat losses with the waste gas and through the vessel walls. The net effect is a reduction in the fuel consumption of the system.

Various efforts have been made to increase the time during which the raw material is exposed to high temperature gases while remaining in suspension. One prior patent utilizes idling chambers which are supplied with a portion of the material which has been heated in a suspension type preheater. The material is subsequently discharged into a rotary kiln for further processing. In that device, however, the kiln exit gas does not flow through the idling chambers to achieve full utilization of the heat from the rotary kiln. In addition, all of the raw material which is discharged from the preheater is not supplied to the idling chamber and, therefore, the idling chamber does not have an opportunity to achieve calcination of the entire raw meal stream.

Another prior art device which includes some recirculation of material being calcined adds fuel to the riser duct carrying kiln exhaust gases to the preheater. Raw material discharged from the preheater is supplied to this riser duct where it is entrained in the hot gases and carried to a gas solids separator. The riser duct serves as both a mixing zone and a combustion zone. The raw material and kiln exhaust gases and combustion gases from the burning of fuel within the riser duct substantially coincide with each other. In this prior art device, separated solids are supplied to either the kiln for final calcination and clinkering or are recycled to the riser duct or portions of the solids are directed to both. This prior device uses a fixed restriction at the inlet of the riser duct and seeks to maintain a constant pressure differential between the inlet and outlet of the riser duct. This pressure differential is used to control the division of material to the kiln or for recirculation through the riser duct combustion zone.

A further refinement of the prior art includes an apparatus wherein material from the suspension type preheater is divided between the suspension calcining furnace and the last stage of the suspension preheater. In this device, however, the full discharge from the last stage of the preheater is supplied directly to the kiln while only a portion of the raw material is supplied to the separate calcining furnace. None of the raw material is recirculated through the separate calcining furnace.

With the present invention, an independent mixing zone for mixing of kiln exit gases and material to be roasted is followed by an independent combustion chamber. The use of independent mixing and combustion zones has the advantage of being able to fully utilize the hot kiln exhaust gases and permits the maintenance of a constant temperature within the calcining furnace itself. With the present invention no attempt is made to maintain a constant pressure in the system as this requires adjustment for varying feed rates and varying gas volumes. The amount of material which is being recirculated is controlled by the level of calcination desired and/or the system operating temperature.

Also according to the present invention it has been discovered that recirculation of the material to be roasted or calcined through the calcining furnace can result in either a higher level of calcination at a given furnace temperature or the same level of calcination can be achieved at a reduced temperature.

Of particular importance to the present invention is the amount of material which is recirculated. In the present invention, a recirculating load of 200%, 300%, 400% and more is contemplated. The recirculating load is defined to mean the quantity of material recirculated through the roasting furnace expressed as a percentage of the quantity of raw material being supplied to the system. The quantity of product being withdrawn from the system is generally equal to the input. By the present invention it has been discovered that with a recirculating load on the order of 400%, a typical cement raw meal can be calcined to a level of 90% at a calcining furnace temperature of 820° C., whereas, with the prior art and no recirculation, the calcining furnace temperature of 970° C. must be maintained to achieve 90% calcination. Similarly at a fixed calcining furnace temperature of 900° C., with 0% recirculation, 80% calcination of cement raw meal is typically achieved, but with 400% recirculating load at 900° C., 98% calcination is achieved.

Heretofore, in order to achieve nearly 100% calcination of fine lime while the material was in suspension, it was necessary to operate at temperatures near or above the coal ash fusion temperature. The coal ash would then cause a build-up on the equipment causing problems with gas and material flows. When utilizing recirculation as described in this invention, roasting of the ore can take place at a lower temperature. Thus, the roasting of certain materials such as lime can be carried out using coal as a fuel.

SUMMARY

It is an object of this invention to provide a more efficient method of and apparatus for roasting fine grained ores such as cement raw meal, lime, gypsum, phosphate rock and the like wherein the material to be roasted is recirculated through the furnace to achieve the desired roasting at a reduced temperature or a higher degree of roasting at a given temperature or a combination thereof.

The foregoing and other objects will be carried out by providing precalcining apparatus for roasting fine grained material such as cement raw meal, lime or dolomite comprising a furnace having an inlet for gas for combustion and raw fine grained material to be roasted, an inlet for fuel for combustion in said furnace and an outlet for spent combustion gas and at least partially roasted fine grained material; a gas-solids separator having an inlet for spent combustion gas and at least partially roasted fine grained material flow connected to the outlet of said furnace, an outlet for separated at least partially roasted fine grained material and an outlet for separated spent combustion gas; and a means for supplying a portion of the at least partially roasted fine grained material from the outlet for separated at least partially roasted fine grained material of said gas-solids separator to the inlet for gas for combustion and raw fine grained material of said furnace and for discharging the remainder of the at least partially roasted fine grained material.

The object of this invention will also be carried out by providing a method for thermal processing of fine grained ore comprising the steps of providing a furnace for calcining the fine grained ore; supplying sufficient fuel and gas for combustion to said furnace to maintain within said furnace a temperature at which the ore to be calcined will be substantially calcined; supplying raw fine grained ore to be processed to said furnace and maintaining said ore in suspension within the furnace; discharging in a stream spent combustion gas and suspended at least partially calcined ore from said furnace; separating the spent combustion gas from the at least partially calcined ore; and, recirculating a portion of the separated at least partially calcined ore to said furnace for further calcination.

BRIEF DESCRIPTION OF THE DRAWINGS

The invention will be described in connection with the annexed drawings wherein:

FIG. 5 is a diagrammatic view of the present invention for roasting fine grained ores using a suspension preheater and suspension cooler;

FIG. 6 is a graph comparing the percent of recirculating load to the temperature in the calcining furnace at varying levels of calcination of the raw material;

FIG. 7 is a graph comparing the temperature in the calcining furnace to the percentage of calcination at varying percentages of recirculating load;

FIG. 9 is a fragmentary view of a portion of an existing cement clinker producing plant utilizing apparatus for modifying that plant to employ the present invention.

DESCRIPTION OF THE PREFERRED EMBODIMENT

The invention will initially be described in connection with the manufacture of cement clinker and a comparison will be made to the prior art for manufacturing cement clinker.

Figure 1:
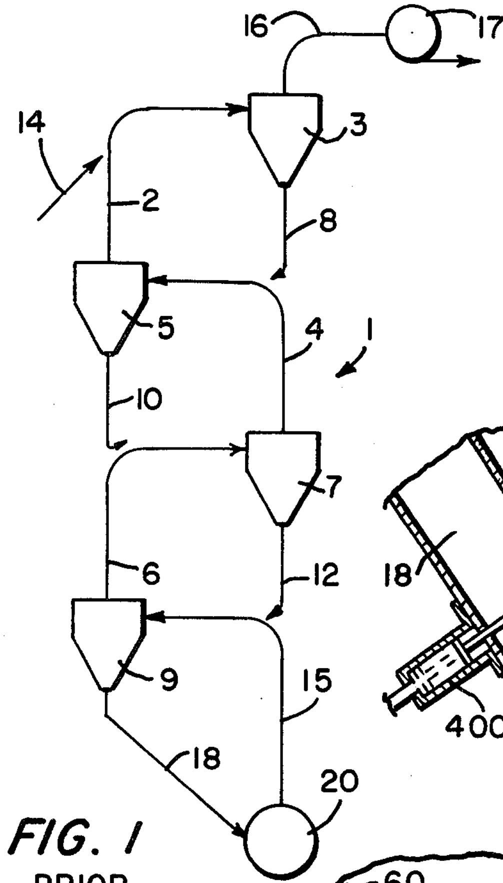
FIG. 1 PRIOR ART
FIG. 1 is a diagrammatic view of apparatus for manufacturing cement clinker using a suspension preheater of the prior art.

As shown in FIG. 1, the prior art suspension preheater-rotary kiln apparatus for producing cement clinker includes a suspension preheater which is generally designated as 1 followed by a rotary kiln generally designated by the numeral 20. The suspension preheater 1 includes a plurality of serially connected cyclone separators 3, 5, 7 and 9. These cyclones are connected by means of ducts 2, 4 and 6. The cyclones also include material outlet ducts 8, 10, 12 and 18. Raw material is supplied to the suspension preheater through inlet 14 and hot spent combustion gas is supplied to the suspension preheater 1 from rotary kiln 20 through riser duct 15. The spent preheater gas is discharged from the preheater 1 through outlet duct 16 and fan 17 through heat recovery equipment (not shown) to a high efficiency dust collector (not shown) and thence to atmosphere. The preheated raw material is discharged from the preheater 1 through material conduit 18 into the kiln 20. As is generally known, the raw material and hot gases are in countercurrent contact with each other from stage to stage within the preheater, including the alternate entrainment, co-current flow, separation and re-entrainment of the cement raw meal in the hot gas. The material which is discharged from the preheater 1 through duct 18 is preheated and partially calcined by the kiln waste gas thus reducing the heat work performed in the kiln and reducing overall fuel consumption.

Figure 2:
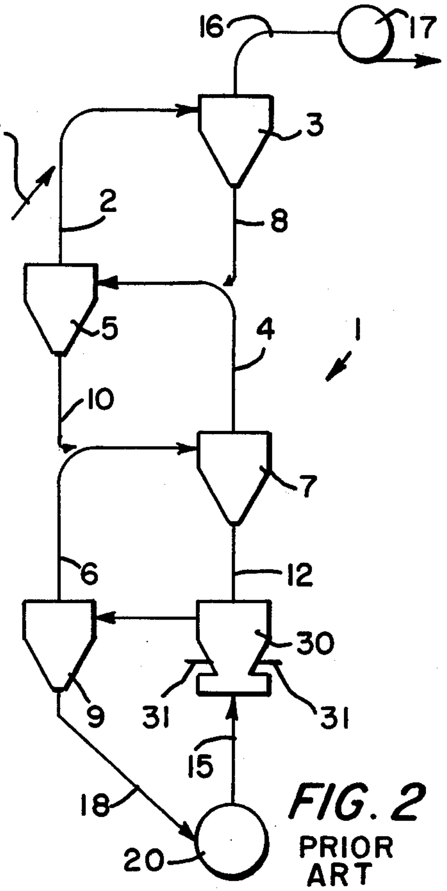
FIG. 2 PRIOR ART
FIG. 2 is a diagrammatic view of apparatus for manufacturing cement clinker using a suspension preheater and calcining furnace of the prior art.

As an improvement to the arrangement shown in FIG. 1, a separate stationary furnace was added to the system to perform the calcining function. With this arrangement the raw material is substantially calcined prior to being supplied to the kiln. This arrangement is generally shown in FIG. 2 wherein parts similar to that shown in FIG. 1 are designated by similar numerals. Thus, the preheater itself is designated by the numeral 1 and the kiln is designated by the numeral 20. The calcining furnace is generally designated by the numeral 30. In this arrangement the exhaust gases from the kiln are supplied through riser duct 15 to the stationary suspension furnace 30 along with hot air from the material cooler through a conduit (not shown). Raw material is supplied to the furnace 30 from the suspension preheater 1 through conduit 12. Fuel is burned in the furnace 30 by means of burners 31 so that the temperature within the furnace is on the order of 900° C. The material remains within the calcining furnace for a very brief period of time and then is separated from the gases in the lower-most gas-solids separator 9 and supplied to the rotary kiln 20. Typically, the raw material is calcined to a level of about 80%–90% in the furnace 30. Since the bulk of the calcining portion of the cement making process is now carried out in a separate stationary calciner rather than within the rotary kiln, an advantage of the system of FIG. 2 is that a given size rotary kiln can be utilized to produce approximately two times as much product as the apparatus shown in FIG. 1.

The short residence time within the calcining furnace 30 is one of the contributing factors to the practical limitation of 80%–90% calcination of the raw material. The percentage of calcination within the prior apparatus as illustrated in FIG. 2 could be increased if the temperature within that furnace were increased to on the order of 1000° C. The disadvantage of such an arrangement would be that the material and fuel ash can become sticky and difficult to handle at such temperatures, resulting in plugging of the various vessels and ductwork. Thus the calcination is completed within the rotary clinkering furnace, since it is not practical to approach 100% calcination in the conventional precalcining system.

It is generally known that the degree of roasting or calcination is a function of both time and temperature. As previously stated, with the prior apparatus the degree of roasting can be increased by increasing the temperature within the calcining furnace. Since the degree of roasting is also a function of residence time, if the effective residence time for the raw material in the roasting system can be increased, then the degree of roasting or calcination can also be increased while maintaining the same temperature within that furnace. The present invention provides a method and apparatus for roasting fine grained ore which includes a means for increasing the effective residence time within the roasting system by increasing the number of times the material to be roasted is passed through the roasting system. With the present invention, it is believed that the amount of calcination which can be achieved can be increased to essentially 100% while maintaining the furnace temperature at an acceptable level. In the alternate, the amount of calcination or roasting can be maintained at a generally constant level but this same amount of calcination can be achieved at a lower furnace temperature. Various processes and systems may have advantages for either form of the improvement.

Figure 3:
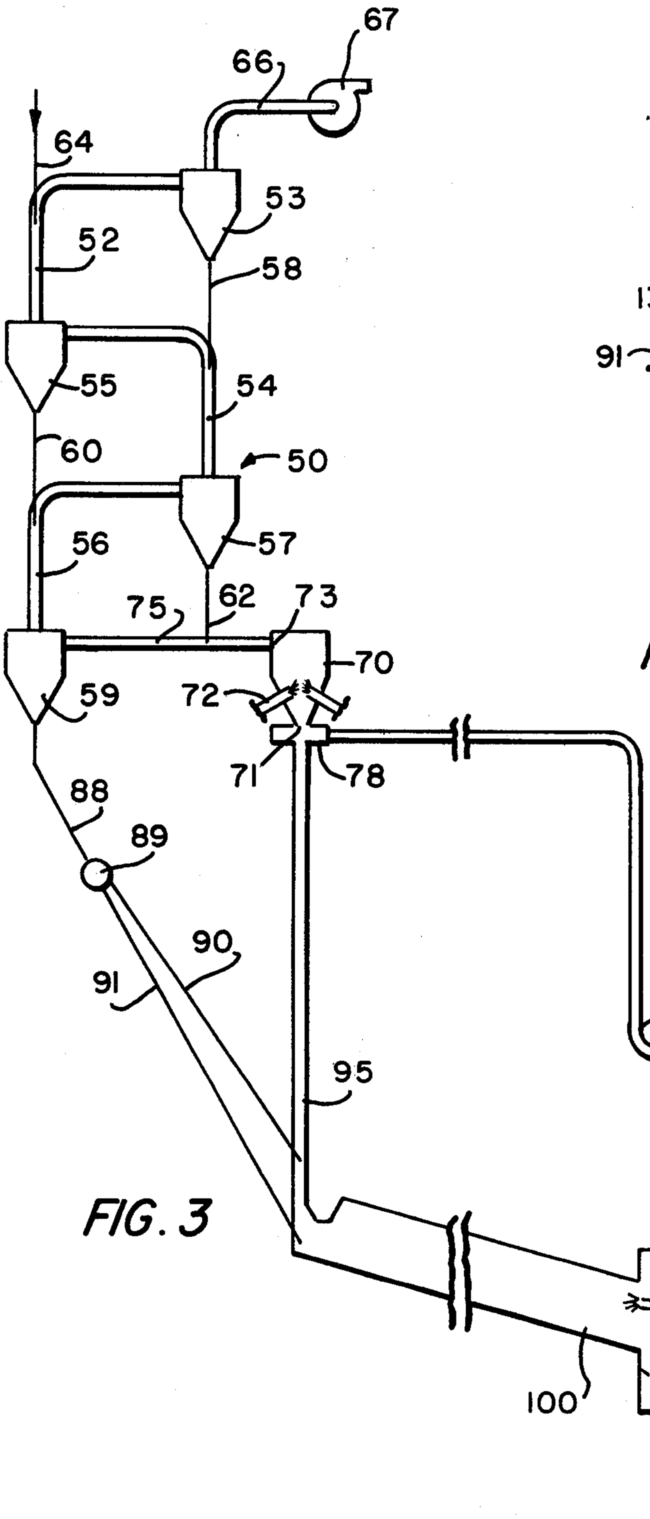
FIG. 3 is a diagrammatic view of the present invention as used in a cement making process.

One embodiment of the present invention is shown in FIG. 3. Generally stated, this embodiment utilizes a precalciner comprising a suspension preheater and suspension type calcining furnace similar to the prior art, followed in the direction of material flow by a rotary kiln and finally by a cooler. The suspension preheater has been generally designated by a numeral 50 and includes a plurality of serially connected cyclone type gas-solids separators 53, 55, 57 and 59. These are connected by means of gas ducts 52, 54 and 56. Material outlet ducts 58, 60, 62 and 88 are also provided. A duct 66 discharges spent preheater gas from the preheater 50. Fan 67 is utilized to maintain a draft on the entire cement clinker producing system, through a high efficiency dust collector (not shown) and exhaust to atmosphere. Raw material is supplied to the preheater 50 at inlet 64 for entrainment and heat exchange in the gas stream in duct 52 and entrance to gas-solids separator 53. Preheated raw material is discharged through duct 58 and re-entrained in the hot gas in duct 54 where it is supplied to separator 55. The gas separated by cyclone 55 is supplied to duct 52 and the partially preheated raw material is discharged through duct 60 to duct 56 for re-entrainment in hot gas and supply to cyclone 57. Gas separated in cyclone 57 is supplied to duct 54 and preheated raw material is supplied by material duct 62 to a conduit 75 flow connecting the calcining furnace 70 with the last stage 59 of the preheater 50.

The calcining furnace or roaster 70 includes a gas mixing chamber 78, an inlet 72 for fuel for combustion in the furnace and an outlet 73 for spent combustion gas and at least partially roasted ore. An inlet 71 for gas for combustion and fine grained material interconnects mixing chamber 78 and inside of roaster 70. Kiln exit gas and recirculated raw meal enter the mixing chamber 78 through riser duct 95. Hot secondary air for combustion enters the mixing chamber 78 from duct 115.

The calcining furnace 70 of FIG. 3 is substantially the same as that shown in U.S. Pat. Nos. 3,891,382 and 4,204,835. It is to be understood, however, that the invention is not to be limited by the particular calciner or roaster illustrated. Within the calcining furnace or roaster 70 fuel is injected through one or more burners 72. Hot exhaust gases and entrained roasted fine grained ore are discharged through duct 75 to cyclone separator 59 entraining and further heating raw material supplied from cyclone 57 through duct 62. The combustion gases from cyclone 59 exit through duct 56 to the remaining stages of the preheater 50 to preheat the raw material. The at least partially roasted ore is discharged from cyclone 59 through an outlet for at least partially roasted ore and duct 88, through diverter valve 89 to be divided between ducts 90 and 91.

The material which is supplied through duct 90 is supplied to riser duct 95 where it is exposed to and mixed with the kiln exhaust gases which have a temperature on the order of 1000° C. The material is entrained in and heated and further calcined by these hot kiln exhaust gases during their flow to the calcining furnace 70. Within the calcining furnace 70 fuel is burned to maintain temperatures on the order of 900° C. and the suspended raw material is calcined to on the order of 80–100%. Thus, an independent mixing zone is provided by the riser duct 95 which takes advantage of the temperature differential between the hot gases and the material. The fuel to the furnace 70 and the recirculation rate can then be controlled so as to achieve essentially complete calcination below ash fusion temperatures.

The material which is supplied through duct 91 is supplied to the rotary kiln 100 where further combustion takes place through burner 101 and the calcined raw material is clinkered. The material is then discharged to a clinker cooler 110. In a manner generally known in the art, in the clinker cooler, cooling air is supplied by means of a fan 111 to pass upwardly through a material supporting grate system 112 and a bed of hot material to thereby cool the material. The air which is utilized in cooling the material is thus heated. Some of this hot air is supplied to the kiln 100 to serve as preheated combustion air in the clinkering stage of the process. Some of the thus heated air is supplied to the calcining furnace 70 through a duct 113, cyclone 114, duct 115 and a chamber 78 for mixing of the kiln exhaust gases and the hot gases from cooler 110. The remaining portion of the cooling air may be used in a separate device (not shown) for drying or discharged to atmosphere through an outlet and high efficiency dust collector (not shown). Cooled cement clinker is discharged from cool 110 at 117. Dust separated in cyclone 114 is returned to the cooler through conduit 118. Within the mixing chamber 78, hot gas from duct 115 is mixed with combustion gas from clinkering furnace 100 and riser duct 95 and entrained material.

In the embodiment shown in FIG. 3, stage four cyclone, in the direction of material flow of the preheater 50 as represented by cyclone 59 is fully utilized as a preheating vessel. In the prior art as represented by FIG. 2, the fourth stage or last cyclone separator 59 of the preheater 1 is utilized primarily as a separating device connected to the calcining furnace 30, and its function is to separate the spent combustion gas from the entrained material from the calcining furnace. With the embodiment shown in FIG. 3, heat exchange occurs between material from stage three (cyclone 57) of the preheater 50 and the hotter gas from the calcining furnace 70. Thus, the fourth stage 59 of the preheater is utilized for preheating material, resulting in increased recovery of heat from the kiln gas. With the present invention, preheater exit gas temperature is reduced, reflecting the improved heat recovery and consequent reduced quantity of heat in the preheater exit gas.

The valve means 89, and conduits 90 and 91 and riser duct 95 serve as a means for supplying a portion of the at least partially roasted fine grained material from the outlet duct 88 for separated at least partially roasted fine grained material of gas-solids separator 59 to the calcining furnace 70 via mixing chamber 78 and inlet 71 for combustion gas and fine grained material, and for discharging the remainder of the at least partially calcined material to the rotary kiln. The conduit 90 and duct 95 serve as the first conduit, and the conduit 91 is the second conduit and the valve means 89 is positioned between said first and second conduits.

Figure 4:
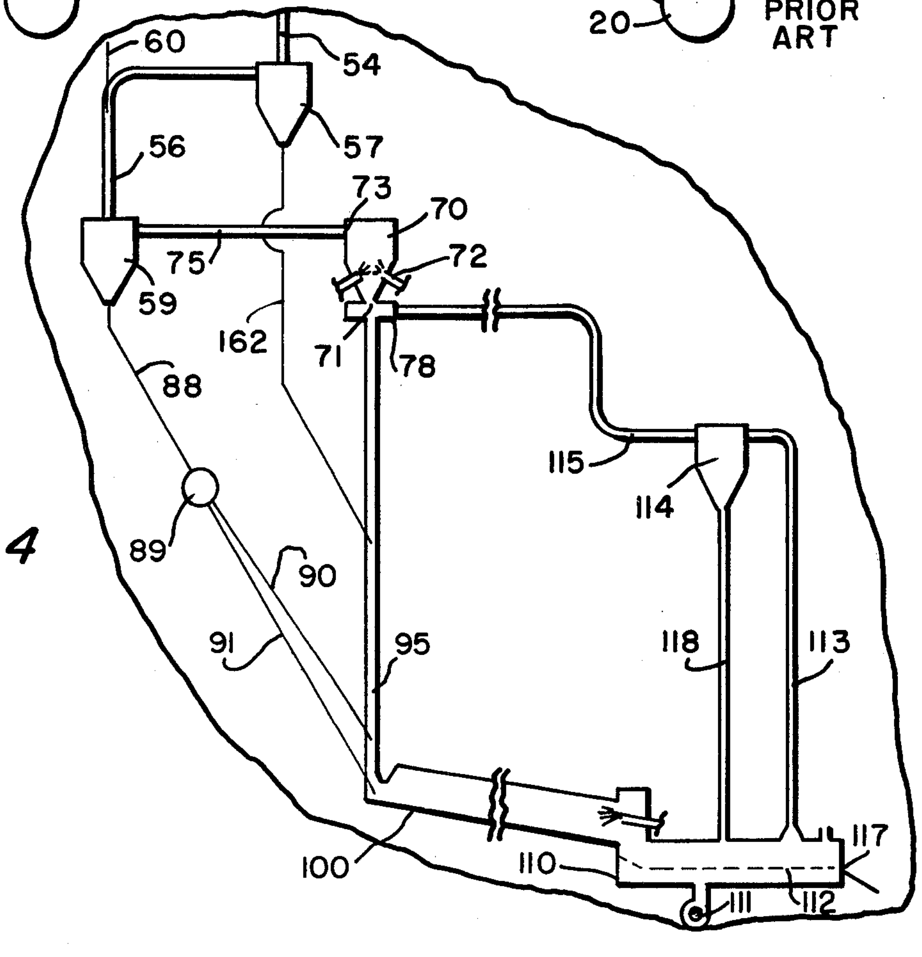
FIG. 4 is a fragmentary view similar to FIG. 3 showing a modification of the present invention.

Turning now to FIG. 4, this embodiment is substantially the same as in the embodiment of FIG. 3 and similar numerals will be used to designate similar parts. In this embodiment material which is discharged from cyclone 57 is supplied through duct 162 to the riser duct 95 from the kiln 100. Thus, there is a direct transfer of preheated raw fine grained material from the stage three preheater vessel 57 into the raw material and hot gas inlet of the calciner 70. In this embodiment raw material is at least partially calcined within the vessel 70 and passes through duct 75 to cyclone 59 which represents the lower-most stage of the suspension preheater 50. The hot spent combustion gas is discharged from cyclone 59 through duct 56 while the raw material which is at least partially calcined is discharged through duct 88, valve means 89 and either first conduit 90 or second conduit 91 to either the kiln 100 or the riser duct 95 for recirculation through calciner 70. Since the fine grained ore is recirculated through the calcining furnace for further exposure to the hot gas therein, the length of time the material is exposed to the high temperature is increased and the degree or amount of calcination will increase.

Figure 8:
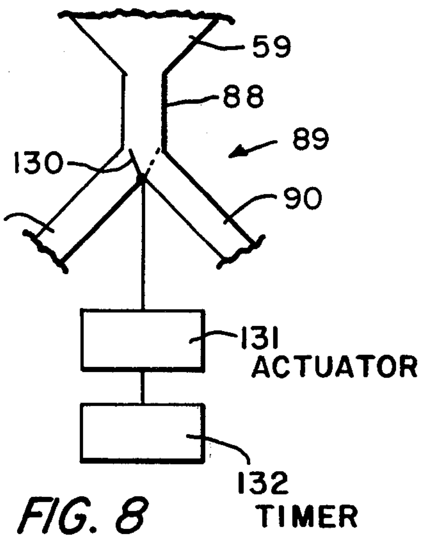
FIG. 8 is a diagrammatic view of a control valve and actuator utilized by the present invention.

The valve 89 can take the form of a stationary splitter to divide the material between the duct 90 and duct 91. In the alternate, the valve 89 can take the form of a timed valve such as that shown in FIG. 8. In such an arrangement a vane 130 is connected to an actuator 131 which is controlled by a timer 132. The vane 130 may be in the position shown in solid for a given period of time to block flow to duct 91 and permit flow to duct 90 for recirculation to riser duct 95 and calciner 70. The timer and actuator then move vane 130 to the position shown by a dotted line which blocks flow to duct 90 and permits flow to duct 91 and the kiln 100 for further processing. The amount of material which is being recirculated to the calcining furnace 70 through the riser duct 95 compared with the amount of material which is discharged to the rotary kiln through duct 91 can be construed to define the recirculating load within the system. Thus, if there is four times as much material entering riser duct 95 from the recirculation duct 90 as the amount of material being discharged to the rotary kiln through duct 91, then there is a 400% recirculating load within the system. This can be accomplished by having the valve 89 set in a stationary position such that four times as much material is supplied to duct 90 as is supplied to duct 91. This can also be accomplished by having vane 130 controlled by timer 132 and actuator 131 so that conduit 90 is open four times as long as conduit 91. Different recirculating loads would be obtained by adjusting the relative dwell periods of the vane 130.

The percent of recirculating load is important in determining the amount of calcination which is accomplished and the temperature at which calcination is achieved. In FIG. 6 each curve represents the amount of calcination achieved depending upon the recirculating load and the temperature within the calciner 70 and more particularly at the outlet 73 of the calciner 70. As can be seen from FIG. 6, if it is desired to achieve 70% calcination, this can be accomplished with 0% recirculating load i.e. in accordance with the prior art as shown in FIG. 2, at a temperature on the order of 860° C. With a recirculating load of 400% the same amount of calcination can be accomplished with a lower temperature, on the order of 800° C. Similarly, if it is desired to achieve calcination of 90%, if the system as shown in FIG. 2 is utilized, a temperature of nearly 1000° C. is required, whereas, with a 400% recirculating load utilizing the calcining method and apparatus of the present invention, the 90% calcination can be achieved with a temperature on the order of 820° C. The reduced calciner temperature produces a lower temperature profile throughout the preheater, with a corresponding reduction in the heat loss from the preheater vessels, ductwork, and exit gas.

Referring to FIG. 7, which shows the relationship between the level of calcination and the calcining temperature for three different recirculating loads, it will be generally seen that the calcination substantially increases at a fixed temperature as the percent of recirculating load is increased from 0% to 200% to 300%.

The fact that a given percentage of calcination can be achieved by a reduced temperature while utilizing the present invention permits the apparatus to be used to achieve nearly 100% calcination of material such as limestone at a temperature which permits the utilization of coal as a fuel without a resultant fusion of the coal ash to the material being processed or to the various vessels and ducts.

In FIG. 5, the application of the roaster of the invention to a process which does not utilize a secondary furnace is shown. In this apparatus a suspension preheater 200 similar to the suspension preheater 50 of FIGS. 3 and 4 is utilized to feed a calciner 230 which is similar to the roaster 70 of FIGS. 3 and 4. Product is discharged from the roaster to a suspension type cooler 250. As with the suspension preheater of the cement process, the suspension preheater 200 includes gas-solids separators 203, 205 and 207. These gas-solids separators are connected by gas ducts 202 and 204 and separated solids duct 208. Raw material to be processed is supplied to the preheater via duct 214. Spent preheating gas is discharged through duct 216 and fan 217 to a high efficiency dust collector 218.

Preheated raw material is supplied from preheater 200 to roaster 230 through solids outlet duct 206 and riser duct 240.

The roaster 230 includes an inlet for fuel 231, an inlet 232 for gas for combustion and raw fine grained ore and an outlet 233 for spent combustion gas and at least partially calcined or roasted ore. The outlet 233 is flow connected to the inlet 234 of gas-solids separator 207 by means of conduit 235.

The suspension cooler 250 includes a plurality of serially connected gas-solids separators 251, 252 and 253 which are connected to each other by means of gas or cooling air conduits 255, 256 and 257 and by means of solids conduits or ducts 258 and 259. Ambient cooling air is supplied to the cooler from the atmosphere through conduit 257 and the cooled product is discharged through outlet 265.

The preheater 200 and cooler 250 operate in a manner generally known in the art by alternate entrainment and separation from either the cooling or preheating air.

The recirculation system operates in a manner similar to that of FIG. 4. At least partially roasted ore and spent combustion gas discharged from furnace 230 through duct 235 and are supplied to gas-solids separator 207. The spent combustion gas is supplied to the preheater 200 through duct 204. The separated at least partially roasted ore is discharged through outlet 288, past valve 289 to either first conduit 290 for recirculation through riser duct 240 to calciner 230 or through second conduit 291 for discharge to the cooler 250. The valve 289 adjusts the recirculating load in the same manner as the system of FIG. 4 and FIG. 8. In FIG. 5, duct 240 acts as an independent mixing zone for hot gas and at least partially roasted material in a manner similar to duct 95 of FIGS. 3 and 4.

Figure 10:
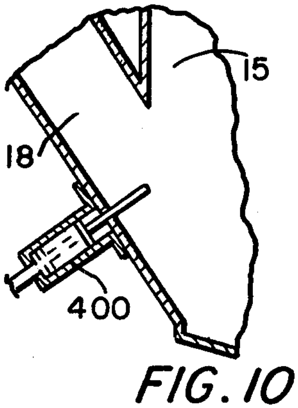
FIG. 10 is a fragmentary detail view of a portion of FIG. 9.

The present invention can also be utilized in existing systems which employs a suspension preheater, flash calciner and rotary kiln. Such an arrangement is shown in FIGS. 9 and 10 wherein a splash plate 400 is inserted in the duct 18 from the discharge of the lower-most cyclone 9 to the kiln. This splash plate is inserted into the material stream so that a portion of the material being supplied to the kiln is forced outwardly into the riser duct 15 leading from the kiln to the calcining furnace 30. This splash plate serves to achieve a recirculation of the raw material being introduced into the rotary kiln without requiring a splitter valve and a separate recirculation duct.

FIG. 10 shows the position of the splash plate 400 within the duct 18. The farther this plate is inserted into duct 18, the greater the amount of recirculation which is obtained. The plate must not, of course, be inserted to such an extent that flow down duct 18 is restricted and plugging occurs.

It is recognized that some preheater installations similar to FIG. 1 of the prior art utilized splash plates in an effort to achieve limited recirculation. It is believed, however, that these installations did not seek to accomplish the degree of recirculation or purpose of increasing calcination of the present invention.

From the foregoing description of the apparatus of the present invention, the method of the present invention should be apparent.

The present invention serves to increase the level of roasting of fine grained ore without an increase in the temperature and corresponding fuel consumption at which the roasting takes place. A given degree of roasting can take place at a lower temperature which means a reduced volume of gas is being handled. This means that a smaller fan is required to handle the gas volume. This can mean lower capital costs, lower horsepower requirements or both. In addition, on an existing system which is limited in capacity by the capabilities of the induced draft fan 17; lower temperature of calcination means less air volume to be handled. Capacity can thus be increased.

A further advantage includes a possible reduction in nitrous oxide emissions due to a greater percentage of the total fuel of calciner 70 and clinkering furnace 100 being burned in the calciner. In addition, due to lower temperatures, build-up of sticky compounds in critical areas may be avoided.

From the foregoing, it should be apparent that the objects of this invention have been carried out. It is intended that the foregoing be a description of preferred embodiments. The invention is, however, to be limited solely by that which is within the scope of the appended claims.

I claim:

1. Apparatus for roasting fine grained material such as cement raw meal, lime or dolomite comprising:

a furnace having an inlet for gas for combustion and raw fine grained material to be roasted, an inlet for fuel for combustion in said furnace and an outlet for spent combustion gas and at least partially roasted fine grained material;

a gas-solids separator having an inlet for spent combustion gas and at least partially roasted fine grained material flow connected to the outlet of said furnace, an outlet for separated at least partially roasted fine grained material and an outlet for separated spent combustion gas;

means defining an independent mixing zone for mixing fine grained material to be roasted and gas for combustion;

means for supplying a portion of the at least partially roasted fine grained roasted fine grained material from the outlet for separated at least partially roasted fine grained material of said gas-solids separator to the means defining an independent mixing zone and the inlet for gas for combustion and raw fine grained material of said furnace and for discharging the remainder of the at least partially roasted fine grained material; and means for directly transferring raw fine grained material to be roasted to said means defining an independent mixing zone.

2. Apparatus for roasting fine grained material according to claim 1 further comprising means for preheating raw fine grained material to be preheated, an inlet for spent combustion gases flow connected to the outlet for separated spent combustion gases of said gas solids separator, and an outlet for preheated raw fine grained material flow connected to the means for supplying raw fine grained material to the means defining a mixing chamber and the inlet for gas for combustion and raw fine grained material of said furnace.

3. Apparatus for roasting fine grained material according to claim 1 wherein said means for supplying a portion of the at least partially roasted fine grained material to the means defining an independent mixing zone includes a first conduit for conducting a portion of the at least partially roasted fine grained material to said inlet for gas for combustion and raw fine grained material of said furnace, a second conduit for discharging the remainder of the at least partially roasted fine grained material to apparatus for further processing the fine grained material, and valve means positioned between said first and second conduits for controlling the proportion of fine grained material that is supplied to said first conduit and the proportion of fine grained material that is supplied to said second conduit.

4. Apparatus for roasting fine grained material according to claim 3 wherein said valve means includes an adjustable splitter for continuously permitting a portion of the fine grained material to be supplied to the said first conduit and a portion of the fine grained material to be supplied to said second conduit.

5. Apparatus for roasting fine grained material according to claim 3 wherein said valve means includes a time controlled splitter for alternately supplying all of the fine grained material to either said first conduit or said second conduit.

6. A method of thermal processing fine grained ore comprising the steps of:

providing a furnace for calcining the fine grained ore;

supplying sufficient fuel and gas for combustion to said furnace to maintain within said furnace a temperature at which the ore to be calcined will be substantially calcined;

supplying raw fine grained ore to be processed to an independent mixing zone where the ore to be processed is mixed with hot gases;

supplying the ore to be processed and hot gases to said furnace and maintaining said ore in suspension within the furnace;

discharging in a stream spent combustion gas and suspended at least partially calcined ore from said furnace;

separating the spent combustion gas from the at least partially calcined ore; and recirculating a portion of the separated at least partially calcined ore to said independent mixing zone and then to said furnace for further calcination.

7. A method of thermal processing fine grained ore according to claim 6 wherein the raw fine grained ore to be processed and the separated at least partially calcined ore are supplied to the furnace in suspension with the combustion gas.

8. A method of thermal processing fine grained ore according to claim 6 further comprising the steps of preheating the raw fine grained ore to be processed by generally countercurrent contact between the spent combustion gas and the raw ore; and cooling the remaining portion of the separated at least partially calcined ore.

9. A method of thermal processing fine grained ore according to claim 7 further comprising the steps of preheating the raw fine grained ore to be processed by countercurrent contact with the spent combustion gas before it is supplied to said furnace; providing a second furnace; and further processing the remaining portion of the separated at least partially calcined ore by supplying such remaining portion to said second furnace; supplying fuel and combustion gas to said second furnace for combustion therein for sintering said remaining portion in said second furnace; supplying the exhaust gases from said second furnace to said mixing zone to serve as hot gases for the second furnace; cooling said sintered product by contact with ambient air whereby the ambient air is heated; and supplying the thus heated ambient air to said furnace to serve as gas for combustion.

10. A method of thermal processing fine grained ore according to claim 6 wherein there is a recirculating load of at least 100% so that the quantity of at least partially calcined ore recirculated to said independent mixing zone is at least equal to the quantity of raw fine grained ore supplied to the independent mixing zone.

11. In an apparatus for producing cement clinker including a preheater, calcining furnace, clinkering furnace and cooler, wherein fuel is supplied to and combustion takes place within both of said calcining furnace and said clinkering furnace and cement raw meal is preheated in said preheater by means of exhaust gases from at least one of said calcining furnace and clinkering furnace and supplied sequentially from said preheater to said calcining furnace to said clinkering furnace to said cooler whereby cooled cement clinker is produced, a riser duct is provided for supplying exhaust gases from the clinkering furnace to the calcining furnace and a conduit for supplying material which has been calcined in the calcining furnace to the clinkering furnace the improvement comprising:

means for inducing a recirculation of at least a portion of the cement raw meal through the calcining furnace before it is supplied to said clinkering furnace including means mounted in said conduit for forcing a portion of the material which has been calcined in said calcining furnace outwardly into said riser duct for entrainment in the exhaust gases from said clinkering furnace which are being supplied to said calcining furnace.

12. In an apparatus for producing cement clinker according to claim 11 wherein the means mounted in said conduit is an adjustable splash plate.

13. A method of thermal processing fine grained ore comprising the steps of:

providing a furnace for calcining the fine grained ore;

supplying sufficient fuel and gas for combustion to said furnace to maintain within said furnace a temperature at which the ore to be calcined will be substantially calcined;

supplying ore to be processed to an independent mixing zone where the ore to be processed is mixed with hot gases;

supplying the ore to be processed and hot gases to said furnace and maintaining said ore in suspension within the furnace;

discharging in a stream spent combustion gas and suspended at least partially calcined ore from said furnace;

supplying raw fine grained ore to be processed to the stream of spent combustion gas and suspended at least partially calcined ore;

separating the spent combustion gas from the ore;

recirculating a portion of the separated ore to said independent mixing zone and then to said furnace for further calcination; and discharging the remaining portion of the separated ore;

the quantity of separated ore which is recirculated to said furnace being at least equal to the quantity of raw fine grained material being supplied to said furnace.

* * * * *